April 15, 1969  C. L. REEVE ET AL  3,438,395

VALVE FOR DELIVERING FLUID AT CONSTANT VELOCITY

Filed March 11, 1966

INVENTORS
C.L. REEVE
L. H. VAUTRAIN
BY Young and Quigg
ATTORNEYS 3,438,395
VALVE FOR DELIVERING FLUID AT CONSTANT VELOCITY
Clifford L. Reeve and Lucien H. Vautrain, Okmulgee, Okla., assignors to Phillips Petroleum Company, a corporation of Delaware
Filed Mar. 11, 1966, Ser. No. 533,485
Int. Cl. G05d 7/00, 13/00, 15/00
U.S. Cl. 137—561                                    3 Claims

ABSTRACT OF THE DISCLOSURE

A valve comprising a valve plug with triangular ports and a system of springs applying a force to the valve stem by which the port is positioned automatically by the flow through the valve to maintain a constant flow velocity.

---

Figure 1:
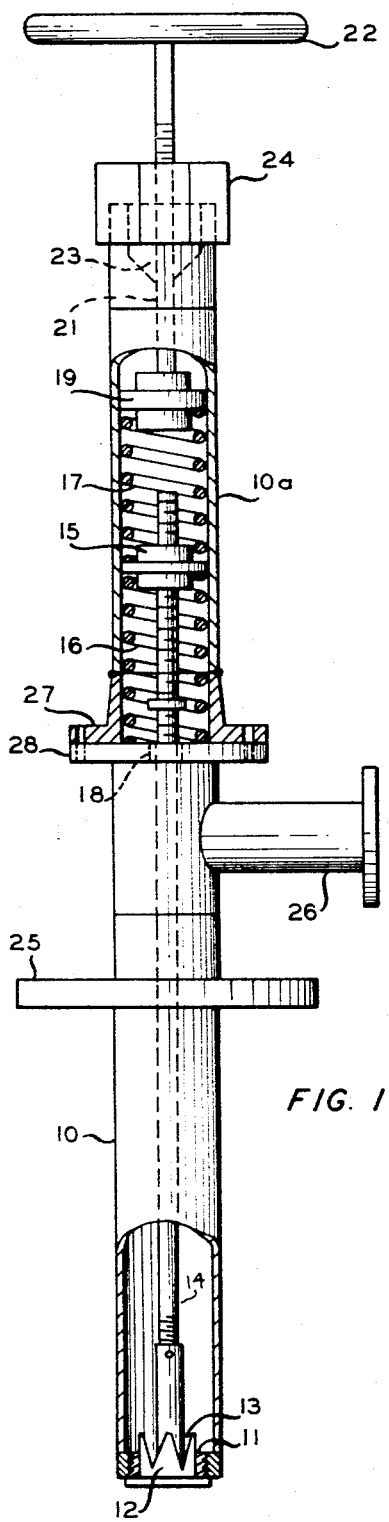

This invention relates to a valve for delivering fluid at constant velocity even though the volume of fluid delivered varies. In another aspect this invention relates to a valve useful for mixing fluids where it is desirable to supply one of the fluids being mixed at a constant velocity.

In many processes, particularly in the handling and treatment of hydrocarbons, it is often necessary to effect thorough and rapid mixing of fluids in order to accomplish a desired treatment. An example of such treatment by admixture is that of contacting a hydrocarbon liquid containing hydrogen sulfide with a solution of caustic (NaOH). Mixing is often accomplished by passing a stream of the liquid hydrocarbon at relatively high velocity into a body of caustic solution and then decanting the treated liquid from the upper portion of the vessel containing the body of caustic solution. The stream of hydrocarbon introduced into the body of treating liquid such as caustic often varies in volume and consequently it has been difficult, if not impossible, to maintain a relatively constant velocity of the liquid hydrocarbon being sprayed into the treating liquid.

According to the present invention a valve is provided which produces a flow of liquid at substantially constant velocity even though the volume of fluid passing through the valve varies over a wide range.

Figure 2:
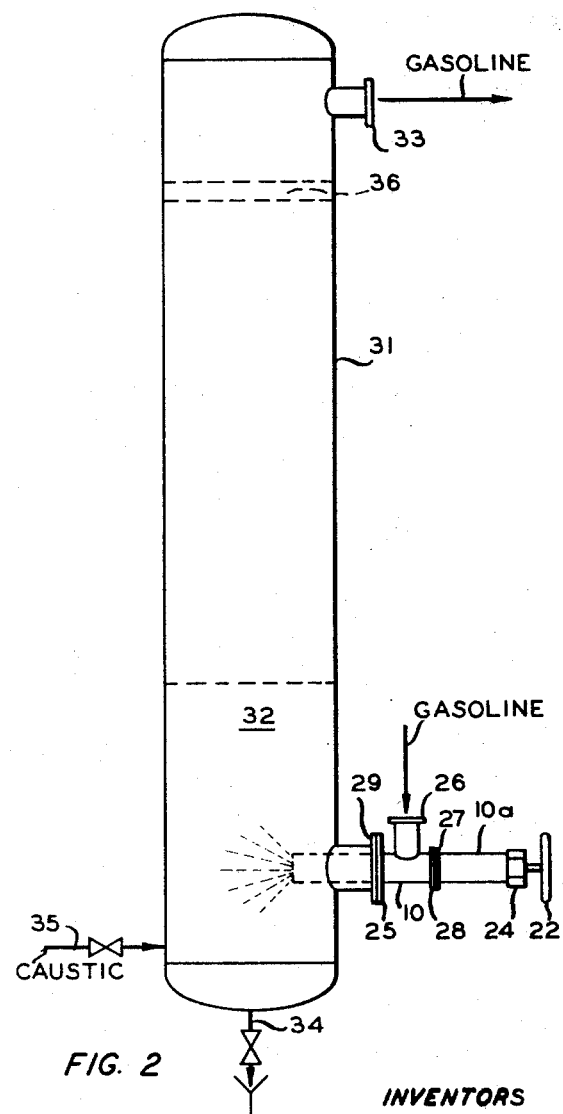

It is an object of this invention to provide a valve which produces a flow of fluid at substantially constant velocity at varying volumes. Another object of this invention is to provide a valve wherein the area of the outlet increases with increasing flow. It is a further object of this invention to provide a valve wherein the plug is balanced between resilient means so that the volume of fluid passed through the valve varies with the pressure of the fluid at the valve inlet. Other objects and advantages of the invention will be apparent to one skilled in the art upon studying the disclosure including the detailed description of the invention and the drawing wherein:

FIGURE 1 is an elevational view, partly in section, of an embodiment of the valve of the invention; and FIGURE 2 is a schematic illustration of a process incorporating therein the valve of FIGURE 1.

Referring now to the drawing and particularly to FIGURE 1, a valve body composed of sections 10 and 10a has an outlet port defined by a bushing 11 and containing a plug 12. Plug 12 has a plurality of V-notches or ports 13 in its sides. Plug 12 is secured to a valve stem 14 which is anchored by floating separator 15 between compression springs 16 and 17. Springs 16 and 17 are confined between shoulder 18 and spring guide 19. Spring guide 19 is secured to shaft 21 which terminates in hand wheel 22. A packing material 23 is compressed about shaft 21 by packing nut 24 so as to form a seal. Flange 25 is used for mounting the valve in a vessel. Fluid is introduced via inlet port 26. Valve body 10 is usually composed of two sections for ease of assembly and the two sections are connected by companion flanges 27 and 28.

In FIGURE 2 the valve is connected by flange 29 to vessel 31 containing a body of caustic (NaOH) solution 32. A fluid to be caustic treated, such as gasoline, is introduced via inlet port 26. The fluid is sprayed into the caustic and then rises through the vessel and is removed via outlet 33. Spent caustic can be removed via conduit 34 and fresh caustic can be admitted via conduit 35. A demisting device 36 can be positioned in the upper part of the vessel 31 if desired.

The following example will be helpful in attaining an understanding of the invention. The example is intended to be illustrative and should not be construed to limit the invention unduly.

EXAMPLE

A valve was constructed according to FIGURE 1 with four triangular slots in the plug. Each triangular slot was 1⅛ inches in height and the base of each triangular slot was 1⁵⁄₁₆ inches. The constant of each of the springs was 70 pounds per square inch.

The valve was installed in an enclosed vessel 11 feet and 6 inches in height and 3 feet and 6 inches in diameter. A body 18 Baumé gravity caustic occupied the lower 5 feet of the tank.

Gasoline was passed through the valve into the vessel at various rates and the results are shown in the following Table I.

TABLE I

| Run | Hydrocarbon (g.p.m.) | Valve stem displacement (in.) | Total port area in.² | Pressure drop through valve | Velocity (ft./sec.) |
|---|---|---|---|---|---|
| 1 | 3 | ⅛ | .036 | 5.58 | 26.7 |
| 2 | 11.8 | ¼ | .146 | 11.16 | 26.1 |
| 3 | 29 | ⅜ | .33 | 16.74 | 28.2 |

The above data show that the valve of the invention supplies fluid at substantially the same velocity at widely varying volumes and pressure drop values. It is noted that when the flow rate was increased about 10 fold there was a slight but noticeable increase in velocity. If a valve is to be used in service where the flow rates can fluctuate over an extremely wide range, the triangular slots in the plug should flare out at the base somewhat similar to the bell of a trumpet so as to provide greater area at extremely high flow rates. The plug can be removed and modified if such is indicated.

That which is claimed is:

1. A constant flow velocity valve comprising:
   a valve body having an inlet port, having an outlet port at one end thereof and having a threaded opening opposite said outlet port;
   a valve plug slidably positioned in said outlet port and having triangular ports on its sides with the apex of each triangular port pointing in the direction of flow therethrough;
   a valve stem secured to said plug and having a positioning flange thereon at a point spaced apart from said plug;

a projection on said body positioned between said plug and said positioning flange surrounding said stem;

a movable control flange positioned in said body between said positioning flange and said threaded opening;

a threaded shaft anchored to said control flange and extending through said threaded opening;

a first compression spring compressed between said projection and said positioning flange;

a second compression sprnig compressed between said positioning flange and said control flange; and means attached to said threaded shaft outside said body to rotate said threaded shaft.

2. A system for admixing two fluids wherein a first fluid is introduced via the valve of claim 1 into a vessel containing a second fluid.

3. A valve according to claim 1 wherein the constant for both springs is substantially the same.

References Cited

UNITED STATES PATENTS

| | | | |
|---|---|---|---|
| 455,853 | 7/1891 | Shepard | 137—529 |
| 2,212,343 | 8/1940 | Goehring | 137—625.3 X |
| 2,336,653 | 12/1943 | Taylor | 137—625.3 |
| 3,342,451 | 9/1967 | Matousek | 251—285 X |

FOREIGN PATENTS

| | | |
|---|---|---|
| 4,425 | 12/1874 | Great Britain. |
| 1,171,586 | 10/1958 | France. |

WILLIAM F. O'DEA, *Primary Examiner.*

D. H. LAMBERT, *Assistant Examiner.*

U.S. Cl. X.R.

137—529, 605; 251—121, 285